United States Patent
Hansen (10) Patent No.: US 10,187,754 B1
(45) Date of Patent: Jan. 22, 2019

(54) TIME AND LOCATION-BASED USER TRACKING AND PRESENCE CONFIRMATION

(71) Applicant: Christopher G. Hansen, Lehi, UT (US)

(72) Inventor: Christopher G. Hansen, Lehi, UT (US)

(73) Assignee: Brilliant Points, Inc., Reno, NV (US)

( * ) Notice: Subject to any disclaimer, the term of this patent is extended or adjusted under 35 U.S.C. 154(b) by 0 days.

(21) Appl. No.: 16/042,426

(22) Filed: Jul. 23, 2018

Related U.S. Application Data (60) Provisional application No. 62/535,914, filed on Jul. 23, 2017.

(51) Int. Cl.

| | |
|---|---|
| H04L 9/06 | (2006.01) |
| H04W 4/02 | (2018.01) |
| H04W 4/029 | (2018.01) |
| G06F 21/32 | (2013.01) |
| H04L 29/08 | (2006.01) |

(52) U.S. Cl.
CPC ............ *H04W 4/029* (2018.02); *G06F 21/32* (2013.01); *H04L 67/22* (2013.01); *H04W 4/023* (2013.01); *H04L 9/0637* (2013.01)

(58) Field of Classification Search
CPC . H04L 9/3247; H04L 2209/80; H04L 9/3297; H04L 63/0861; H04L 63/107; H04L 9/3236; H04W 4/029; H04W 4/023; G01S 5/0027; G01S 19/42; G06F 21/32
See application file for complete search history.

(56) References Cited

U.S. PATENT DOCUMENTS

| | | | |
|---|---|---|---|
| 2004/0044911 A1* | 3/2004 | Takada | G01S 5/0027 |
| | | | 713/170 |
| 2007/0118739 A1* | 5/2007 | Togashi | G06Q 10/10 |
| | | | 713/158 |
| 2011/0109508 A1* | 5/2011 | Wolman | G01S 5/0205 |
| | | | 342/451 |
| 2016/0234207 A1* | 8/2016 | Bauchspies | G06F 21/31 |
| 2017/0041148 A1* | 2/2017 | Pearce | H04L 9/3247 |
| 2018/0049028 A1* | 2/2018 | Tali | H04W 4/029 |

OTHER PUBLICATIONS

Website Alibi "www.discoveralibi.com" accessed on Oct. 22, 2018. 2 pgs.

* cited by examiner

*Primary Examiner* — Nizar N Sivji
(74) *Attorney, Agent, or Firm* — Maschoff Brennan; Paul G. Johnson

(57) ABSTRACT

A method may include obtaining a first indicator of a first location of a user at a first time; identifying the user at the first location at the first time; obtaining a second indicator of the first location of the user at the first time; confirming the first location of the user at the first time by comparing the first and second indicator; storing the first record; obtaining a first indicator of a second location of the user at a second time; identifying the user at a second location at the second time; storing a second record, the second record comprising the second indicator of the second location, a second indication of the second time, and a second indication of the identity of the user at the second location at the second time; and linking the first and second records to create an unalterable alibi of the user.

18 Claims, 4 Drawing Sheets

TIME AND LOCATION-BASED USER TRACKING AND PRESENCE CONFIRMATION

CROSS-REFERENCE TO RELATED APPLICATION

This application claims the benefit of and priority to U.S. Provisional Application No. 62/535,914, filed Jul. 23, 2017, and titled "Location Verification System," which is incorporated herein by reference in its entirety.

FIELD

The embodiments discussed in the present disclosure are related to obtaining data regarding the presence of a user in a plurality of locations over a period of time.

BACKGROUND

A user may desire an accurate and irrefutable accounting of his or her whereabouts at specific times. In some examples, the accounting may be used to provide an alibi in a court case. In other examples, the accounting could be used to prove a user's whereabouts for litigation purposes, employment purposes, custody purposes, tax purposes, and/or other purposes. There may be other reasons that a user might benefit from having an accurate and provable report of his or her locations over time.

The subject matter claimed in the present disclosure is not limited to embodiments that solve a particular disadvantage or that operate only in environments such as those described above; rather, this background is only provided to illustrate one example technology area where some embodiments described in the present disclosure may be practiced.

SUMMARY

In an example embodiment, a method may include obtaining, by a processor, a first indicator of a first location of a user at a first time period; identifying the user at the first location at the first time period; obtaining a second indicator of the first location of the user at the first time period; confirming the first location of the user at the first time period by comparing the first indicator and the second indicator; storing the first record on a storage device; obtaining, by the processor, a third indicator of a second location of the user at a second time period; identifying the user at the second location at the second time period; storing a second record on the storage device, the second record comprising the third indicator of the second location, a second indication of the second time period, and a second indication of the identity of the user at the second location at the second time period; and linking the first record and the second record to create an unalterable third record of an alibi of the user.

In another example embodiment, the method may further include encrypting the unalterable third record; and sending the third record to a third party.

In some cases, identifying the user may include obtaining biometric data from the user. In some cases, obtaining the first, second, and third indicator may include obtaining at least one of photographic data, video data, sound data, text data, wireless data, alphanumeric data.

In some cases, obtaining the second indicator may further include obtaining the second indicator by a second means different from a first means to obtain the first indicator. In some cases, obtaining the second indicator may further include requesting, by the processor, data from a second user identified to be within a pre-determined distance of the first location at the first time, and confirming the presence of the user at the first location at the first time period based at least on data from the second user.

In some cases, the method may further include applying a computer learning algorithm to the comparison of the first indicator and the second indicator, determining an accuracy score of the first record based in part on applying the computer learning algorithm, and updating the first record based in part on the accuracy score.

In some cases, linking the first record and the second record may further include linking using block chain encryption. In some cases, obtaining the first indicator of the first location may further include obtaining the first indicator automatically obtained without input from the user, or in some cases, determining that the user is within a pre-determined distance of the first location, and automatically obtaining the first indicator. In still other cases, obtaining the first indicator of the first location may further include receiving a request from the user to obtain the first indicator of the first location at the first time.

In some cases, the method may further include determining an attempt to falsify the first record, and blocking further attempts to obtain indicators of the location of the user. In some cases, the method may further include storing the first record in memory associated with the processor. In still further cases, the method may further include sending the encrypted first record to a third party storage device.

In some embodiments, the method described above may be performed by a system, where the system includes a processor, memory in electronic communication with the processor, and instructions stored in the memory, the instructions being executable by the processor to cause the system to perform the operations described above and herein. In some embodiments, one or more non-transitory computer-readable media comprising one or more computer-readable instructions, that when executed by one or more processors of a computing device may cause the computing device to perform the method described above and herein.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which.

DESCRIPTION OF EMBODIMENTS

Some embodiments described in the present disclosure relate to methods and systems of time and location-based user tracking and presence confirmation over a period of time and/or over multiple periods of time.

In at least one example, obtaining and preparing an accurate and reliable accounting of a user's whereabouts may be used to verify that the user is where he or she says he or she is, or was, at a specific time. Such an accounting may be useful to provide an alibi if the user is accused of a crime or may be useful in other circumstances and/or for other purposes. In terms of an alibi, the knowledge that the systems and methods described herein may be used to construct an accurate and secure accounting of a user's locations may encourage users to participate in data collection and/or sharing. The increased participation in data sharing and collection may improve the system's abilities to construct the accounting, as well as continue to verify and secure the data provided by one or more users.

In another example, the accounting may be used if the user is an employee or an independent contractor and the user's whereabouts are needed for example purposes such as contracts, tax, liability, salary, and the like. In another example, the methods and systems described herein may be used to ensure that parties meeting to sell or purchase items, or who want to meet publicly for another reason with a stranger, may be provided with locations known to have working security cameras or other security data collecting systems. Other example embodiments are contemplated and are not limited to these examples.

Thus, a check-in system which enables users to verify their identity and presence, while protecting their privacy, is provided herein. Embodiments of the present disclosure are explained with reference to the accompanying drawings.

Figure 1:
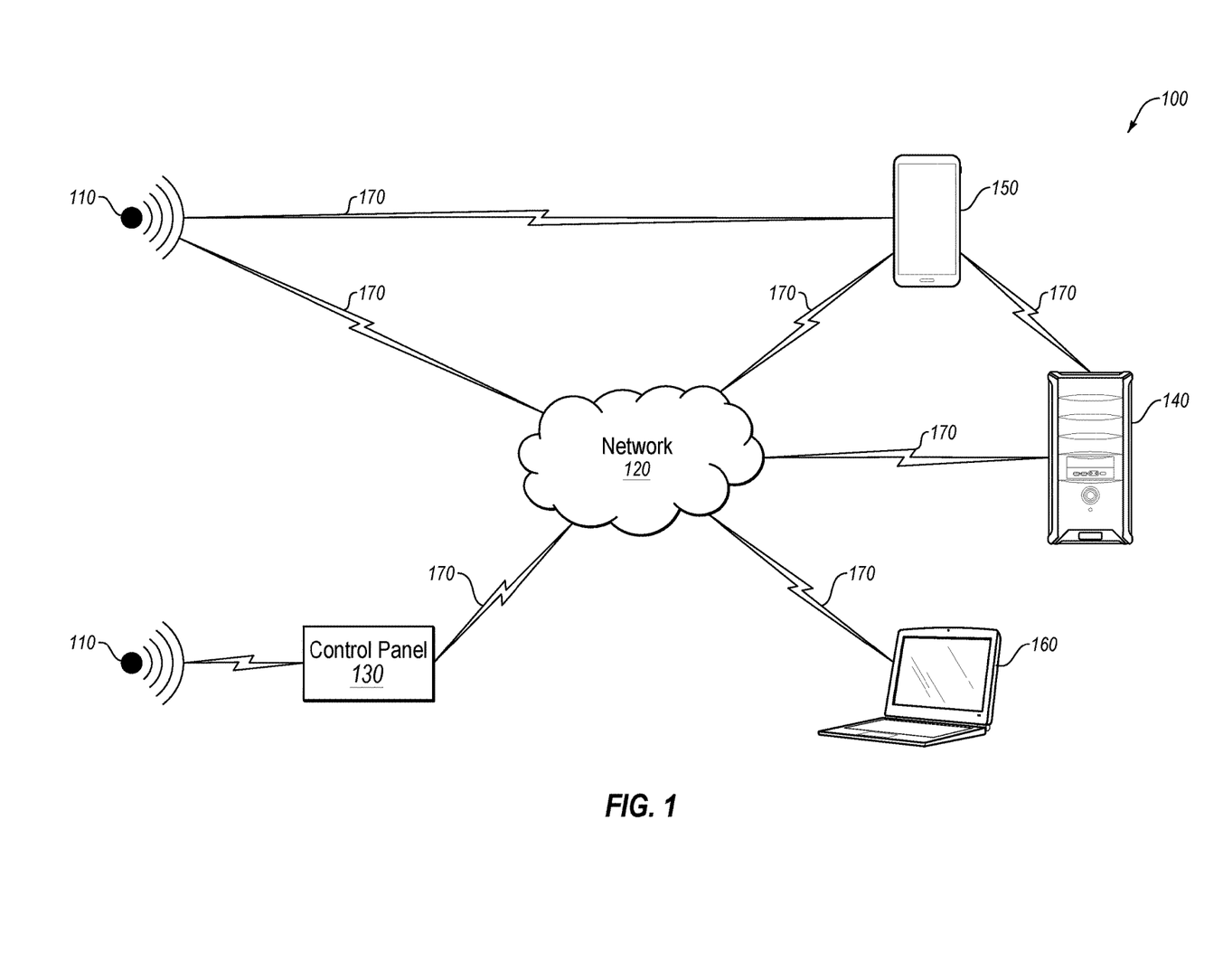
FIG. 1 illustrates an example communications system related to time and location-based user tracking and presence confirmation in accordance with at least one embodiment.

FIG. 1 illustrates an example communications system 100 related to time and location-based user tracking and presence confirmation in accordance with at least one embodiment described in the present disclosure. The communications system 100 may include one or more sensor units 110, a network 120, a control panel 130, a server 140, a remote computing device 160, and/or a local computing device 150. The remote computing device 160 and the local computing device 150 may each be referred to generically as computing device 150 or 160 and/or together as computing devices 150, 160. The network 120 may communicate by way of wired or wireless communication links 170 with the sensor units 110, the local computing device 150, the remote computing device 160, and the server 140. The control panel 130 may interface with the network 120 through wired and/or wireless communication links 170 to communicate with one or more remote servers (e.g., the server 140). The control panel 130 may perform communication configuration, adjustment, and/or scheduling for communication with the computing devices 150 and 160, or may operate under the control of a controller. The control panel 130 may communicate with a back end server (e.g., the server 140)—directly and/or indirectly—using at least one of the communication links 170.

The control panel 130 may wirelessly communicate with the computing devices 150, 160 by way of one or more antennas. The control panel 130 may provide communication coverage for a respective geographic coverage area (not specifically illustrated in FIG. 1). In some examples, the control panel 130 may be referred to as and/or may include a control device, a base transceiver station, a radio base station, an access point, a radio transceiver, or some other suitable terminology or device. The geographic coverage area for the control panel 130 may be divided into sectors making up only a portion of the full coverage area. The communications system 100 may include control panels of different types. There may be overlapping geographic coverage areas for one or more different parameters, including different technologies, features, subscriber and/or user preferences, laws, regulations, hardware, software, technology, and/or methods. For example, each control panel may be related to one or more discrete structures (e.g., a home, a business, etc.) and each of the one or more discrete structures may be related to one or more discrete areas (e.g., a neighborhood, a city, a state, etc.). In other examples, multiple control panels may be related to the same one or more discrete structures (e.g., multiple control panels may be associated with a single home and/or business complex).

The computing devices 150 and 160 may be dispersed throughout the communications system 100 and each of computing device 150 and 160, respectively, may be stationary and/or mobile. The computing devices 150 and 160 may each include a cellular phone, a tablet computer, a wearable electronic device (e.g., a smart watch, a biometric sensor and/or a tracker), a personal digital assistant (PDA), a wireless modem, a handheld device, a laptop computer, a cordless phone, a wireless local loop (WLL) station, a display device (e.g., a television set, a computer monitor, etc.), a printer, a camera, other suitable computing device, or any combination of the above. The computing devices 150 and 160 may also include or be referred to as a user device, a user equipment, a smartphone, a BLUETOOTH® device, a Near-Field Communication (NFC) device, a Wi-Fi device, a mobile station, a subscriber station, a remote unit, a handset, a user agent, a mobile client, a client, and/or some other suitable terminology.

The geographic coverage area for the control panel 130 may be divided into sectors making up only a portion of the coverage area. The communications system 100, therefore, may include more than one control panel 130, where each control panel 130 may provide geographic coverage for a sector of the coverage area.

The communications system 100 may include one or more control panels 130 of different types; for example, the control panel 130 may be a local computing device and/or a computing interface located at a home and/or business. The control panel 130 may be in direct communication by way of wired or wireless communication links with the one or more sensor units 110. Alternatively or additionally, the control panel 130 may receive sensor data from the one or more sensor units 110, e.g., by way of the computing devices 150, 160, the server 140, and/or the network 120.

In at least one embodiment, the control panel 130 may include, or otherwise be coupled to/in communication with, a speaker, a microphone, and/or a camera. The control panel 130 may operate to broadcast audio and/or video communications from computing devices 150 and/or 160. Alternatively or additionally, the control panel 130 may receive input in the form of audio input, video input, biometric data, geographic data (e.g., geotagging, global positioning data), regulatory data, or other data.

The control panel 130 may wirelessly communicate with the sensor units 110 via one or more antennas. The sensor units 110 may be dispersed throughout the communications system 100 and each of the sensor units 110 may be stationary and/or mobile. Each of the sensor units 110 may include and/or may be one or more sensors that sense: proximity, motion, temperatures, humidity, vibration, sound level, smoke, structural features (e.g., glass breaking, window position, door position), time, amount of light, geolocation data of a user and/or a device, distance, biometrics, weight, speed, height, size, gait, preferences, weather, system performance, respiration, heartbeat, and/or other inputs that relate to time-based verification of determining the presence of a specific user at a specific location.

The computing devices 150 and/or 160 and/or at least one of the sensor units 110 may be able to communicate through one or more wired and/or wireless connections with various components such as control panels, antennas, base stations, and/or network equipment (e.g., servers, wireless communication points, etc.).

The communication links 170 illustrated in communications system 100 may include uplink (UL) transmissions from computing devices 150 and 160 and/or the sensor units 110 to control panel 130, and/or downlink (DL) transmissions, from control panel 130 to devices 150 and/or 160. The downlink transmissions may also be called forward link transmissions while the uplink transmissions may also be called reverse link transmissions. Each communication link 170 may include one or more carriers, where each carrier may be or include a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 170 may transmit bidirectional communications and/or unidirectional communications, including 345 MHz, Wi-Fi, BLUETOOTH®, BLUETOOTH® Low Energy, cellular, Z-WAVE®, millimeter wave, 802.11, peer-to-peer (P2P), LAN, WLAN, Ethernet, FireWire, fiber optic, and/or other connection types.

In some embodiments, the control panel 130 and/or the computing devices 150 and/or 160 may include one or more antennas configured to employ antenna diversity schemes to improve communication quality and reliability between the control panel and the computing devices. Additionally or alternatively, the control panel 130 and/or the computing devices 150 and 160 may employ multiple-input, multiple-output (MIMO) techniques that may take advantage of multi-path, mesh-type environments to transmit multiple spatial layers carrying the same or different coded data.

While the computing devices 150 and/or 160 may communicate with each other through the control panel 130 using communication links 170, each of the computing devices 150 and/or 160 may communicate with one or more other devices by way of one or more direct communication links 170. Two or more of the computing devices 150 and 160 may communicate via a direct communication link 170 when both of the computing devices 150 and 160 are in the geographic coverage area or when one or neither of the computing devices 150 or 160 is within the geographic coverage area. Examples of direct communication links 170 may include Wi-Fi Direct, BLUETOOTH®, wired, and/or other P2P group connections. The computing devices 150 and 160 in these examples may communicate according to the Wide Local Area Network (WLAN) radio and baseband protocol including physical and Media Access Control (MAC) layers from the Institute of Electrical and Electronics Engineers (IEEE) standards, such as 802.11, and its various versions including: 801.11a, 802.11b, 802.11g, 802.11n, 802.11ac, 802.11ad, and 802.11ah. In other implementations, other P2P connections and/or ad hoc networks may be implemented within communications system 100.

In some examples, the local computing device 150 may be or include a custom computing entity configured to interact with the sensor units 110 via the network 120 and/or the server 140. In other examples, the local computing device 150 may be or include a general purpose computing entity such as a personal computing device; for example, the local computing device 150 may be or include a desktop computer, a laptop computer, a netbook, a tablet personal computer (PC), a control panel, an indicator panel, a multi-site dashboard, an IPOD®, a smartphone, a cellular phone, a PDA, and/or any other suitable device operable to send and receive signals, store and retrieve data, and/or execute software components.

The computing devices 150 and 160 may each include memory, a processor, an output, a data input, and a communications component. The processor may be or include a general purpose processor, a Field Programmable Gate Array (FPGA), an Application Specific Integrated Circuit (ASIC), a Digital Signal Processor (DSP), or other suitable processor device. The processor may be configured to retrieve data from and/or write data to the memory.

The memory may be or include a random access memory (RAM), a memory buffer, a hard drive, a database, an erasable programmable read only memory (EPROM), an electrically erasable programmable read only memory (EE-PROM), a read only memory (ROM), a flash memory, a hard disk, a floppy disk, cloud storage, or other suitable memory device or system. In some embodiments, the computing devices 150 and 160 may include one or more hardware-based modules (e.g., FPGA, ASIC, DSP, etc.) and/or software-based modules (e.g., a module of computer code stored at the memory and executed at the processor, a set of processor-readable instructions that may be stored at the memory and executed at the processor) associated with executing an application, such as, for example, receiving, analyzing, transmitting, and/or displaying data from the sensor units 110.

The processor of the local computing device 150 may be operable to control operation of the output of the local computing device 150. The output may be or include a television, a liquid crystal display (LCD) monitor, a cathode ray tube (CRT) monitor, a plasma monitor, a speaker, tactile output devices (e.g., a capacitive touchscreen device), a smart speaker, hearable devices, holograms, or other suitable output device or component. In some embodiments, the output may be an integral component of the local computing device 150; for example, the output may be directly coupled to the processor. In some embodiments, an output component may include a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 150 to the output.

The remote computing device 160 may be or include a computing entity operable to enable a remote user to monitor the output of the sensor units 110 and/or the local computing device 150. The remote computing device 160 may be functionally and/or structurally similar to the local computing device 150 and may be operable to receive data streams from and/or send signals to at least one of the sensor units 110 via the network 120. The network 120 may be or include the Internet, an intranet, a personal area network (PAN), a local area network (LAN), a wide area network (WAN), a virtual network, a telecommunications network implemented as a wired network and/or wireless network, or other suitable network. The remote computing device 160 may receive and/or send signals over the network 120 by way of communication links 170 and/or the server 140.

In some embodiments, one or more of the sensor units 110 may communicate through wired and/or wireless communication links 170 with one or more of the computing devices 150 and 160, the control panel 130, and/or the network 120. The network 120 may communicate through wired and/or wireless communication links 170 with the control panel 130 and the computing devices 150 and 160 through the server 140. Alternatively or additionally, the network 120 may be integrated with any of the computing devices 150 and 160 and/or the server 140 such that separate components are not required. Additionally, in another embodiment, one or more of the sensor units 110 may be integrated with the control panel 130, and/or the control panel 130 may be integrated with the location computing device 150 such that separate components may not be needed.

In some embodiments, the one or more sensor units 110 may be or include sensors configured to conduct periodic or ongoing automatic measurements related to determining the identity of a user (e.g., a homeowner, a renter, a lessee, an employee. etc.), as well as automatically determining the location of a user at a location, at and/or during a specific time or times. Each of the sensor units 110 may be enabled to sense multiple identifications, location-determining, and/or time-determining parameters, or alternatively, separate sensor units 110 may monitor separate identification and/or location determining parameters. For example, one sensor unit 110 may receive data used to determine the identity of a user, whereas a second sensor unit 110 may receive data used to determine the location of the user, and a third sensor unit 110 may receive data related to the time the user is present in a specific location.

In some embodiments, the local computing device 150 may additionally monitor alternate location-determination parameters, such as detecting a heartbeat, breathing, motion, heat signatures, and/or audio. In alternative embodiments, a user may input identification and/or location information directly at the local computing device 150 or a control panel 130. The identification and/or location data may be communicated to the remote computing device 160 for verification. In some embodiments, the identification and/or location data communicated to the local and/or remote computing devices 150 and 160 may be encrypted. Alternatively or additionally, a GPS chip or other feature integrated with the user's local computing device 150 may communicate the user's location to the remote computing device 160.

In some embodiments, one or more of the sensor units 110 may be separate from the control panel 130 and may be positioned at various locations throughout a property (e.g., a house, an apartment, a room, an office building, outside of a building, and/or in other properties). Alternatively or additionally, one or more of the sensor units 110 may be dispersed at different locations in a geographic area, such as at different buildings (inside and outside), outside on public streets and walkways and/or parks, and/or in locations in a geographic area. Alternatively or additionally, the one or more sensor units 110 may be integrated or collocated with other building automation system components, home appliances, building fixtures, and/or other structures, devices, or components; for example, one of the sensor units 110 may be integrated into a front door monitoring system, a light fixture, a wall outlet or switch, a home or office automation digital interface, or other structure, device, or component. In any embodiment, any of the sensor units 110, the control panel 130, and/or the computing devices 150, 160 may include a speaker unit, a microphone unit, and/or a camera unit.

The server 140 may be configured to communicate with the one or more sensor units 110, the local computing device 150, the remote computing device 160, and/or the control panel 130. The server 140 may perform additional processing on signals received from the one or more sensor units 110, the local computing device 150, or the control panel 130, and may forward the received information to the remote computing device 160.

The server 140 may be or include a computing device operable to receive data streams, store, and/or process data, and/or transmit data and/or data summaries and analysis. The server 140 may include a database (e.g., in memory) containing location, identification, time, and/or authentication data received from the sensor units 110 and/or the local computing device 150 and/or the control panel 130. Additionally, software (e.g., stored in memory) may be executed on a processor of the server 140.

Modifications, additions, or omissions may be made to FIG. 1 without departing from the scope of the present disclosure. For example, the communications system 100 may include more or fewer elements than those illustrated and described in the present disclosure. In addition, in some embodiments, the sensor units 110, the control panel 130, the local and/or remote computing devices 150 and 160, respectively, and/or the server 140 may be combined such that they may be considered the same device.

Figure 2:
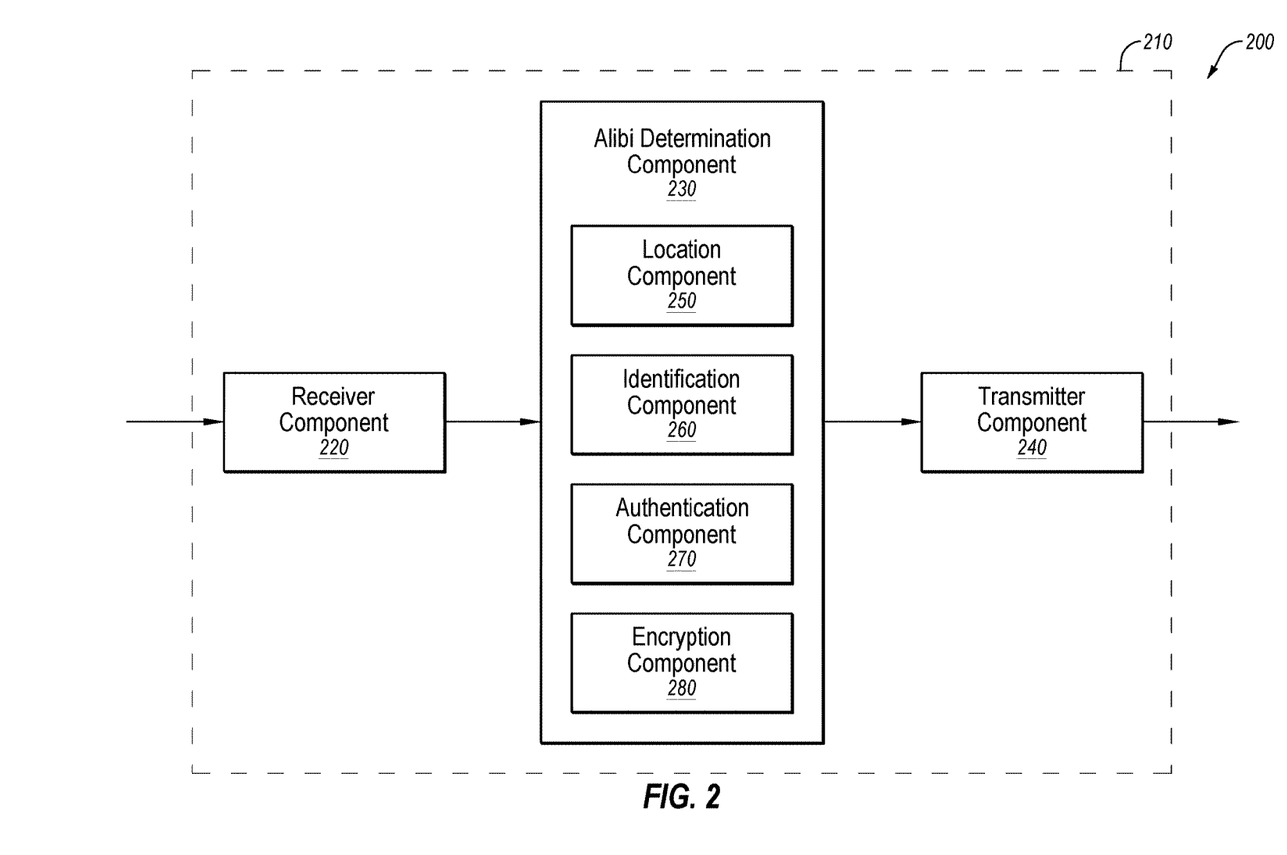
FIG. 2 illustrates a block diagram of an example apparatus related to time and location-based user tracking and presence confirmation in accordance with at least one embodiment.

FIG. 2 illustrates a block diagram 200 of an example apparatus 210 related to time and location-based user tracking and presence confirmation in accordance with at least one embodiment. The apparatus 210 may be an example of one or more aspects, features, or components of the control panel 130, the local computing device 150, the remote computing device 160 and/or one or more of the sensor units 110. The apparatus 210 may include a receiver component 220, an alibi determination component 230, and/or a transmitter component 240. The apparatus 210 may also be or include a processor. Two or more of the components of the apparatus 210 may be in communication with one another—directly and/or indirectly.

The components of the apparatus 210 may, individually or collectively, be implemented using one or more ASICs adapted to perform some or all of the applicable functions in hardware. Alternatively, the functions may be performed by one or more other processing units or cores, on one or more integrated circuits. In other examples, other types of integrated circuits may be used (e.g., Structure/Platform ASICs, FPGAs, and other custom or Semi-Custom ICs), which may be programmed in any manner known in the art. The functions of each component may also be implemented—in whole or in part—with instructions embodied in memory formatted to be executed by one or more general and/or application-specific processors.

In at least one embodiment, the apparatus 210 may be or include a computing system or sensor located at a location; for example, the apparatus 210 may be or include an interactive wall panel located outside an entrance to a building, or may be or include an interactive wall panel located at any location within a building. In some embodiments, the apparatus 210 may not be interactive, but may rather be or include a passive sensor, such as an RFID scanner, a motion sensor, a security camera, a base station, a hotspot, or other passive sensor. Alternatively or additionally, the apparatus 210 may be or include a hand-held personal computing device in the possession of a user to be tracked, such as a smart phone, a tablet device, a wearable computing device, or other hand-held personal computing device. The location at which the apparatus 210 may be located may include a residence, curtilage (e.g., inside or outside of a garage, a barn, a shed, a patio, or other structure or area in or on an area of land surrounding a house), a commercial building, a government building, a park, streets, banks, restaurants, plazas, a gymnasium, a school, or other locations.

In at least one embodiment, the apparatus 210 may be or include a biometric sensor such as an eye scanner, a fingerprint scanner, a palm scanner, a voiceprint sensor, a camera calibrated to identify facial structure; a GPS receiver or an input device (e.g., a keypad) into which a user may input a personal identification number (PIN); a motion sensor; a vibration sensor; a light sensor, or other biometric sensor. Alternatively or additionally, a user may interact with a software application executing on a smart computing device to "check-in" that he or she is present at a location. Any of the aforementioned devices may be enabled to determine the presence of a user at a location, but may not, at this stage, necessarily confirm the identification of a person. In some embodiments, GPS coordinates of a location to be monitored may be stored in memory with a third-party. The location data may be communicated to the transmitter component 240, and the transmitter component 240 may communicate the location data to the remote computing device 160, the server 140, and/or other device or system.

The receiver component 220 may receive information such as packets, user data, and/or control information associated with various information channels (e.g., control channels, data channels, etc.). The receiver component 220 may be configured to receive data, audio and/or video streams from the remote computing device 160, which may be operated by a third party. Received data, audio and/or video streams may be passed onto alibi determination component 230. In addition, the alibi determination component 230 may detect data, audio, video, identification, location, time, authentication, and/or encryption information at the apparatus 210 and may communicate the detected data to the transmitter component 240, and/or to other components of the apparatus 210 not specifically illustrated in FIG. 2.

Where the apparatus 210 is or includes any of a sensor unit, a control panel, or a local computing device, the receiver component 220 may be operable to receive audio and/or video broadcasts from the remote computing device. Such audio and/or video broadcasts may be in the form of real-time verbal and/or graphic (e.g., video or still image) communications or a transmission of a pre-recorded communication. In some embodiments, the pre-recorded communication may be created by the manufacturer (i.e., messages that are pre-programmed by the original equipment manufacturer) or may be user-provided.

The transmitter component 240 may then communicate the data to the remote computing device 160, the control panel 130, and/or the server 140. In some embodiments, a user may personally record a message to broadcast when certain conditions are met. In some embodiments, the audio and/or visual communication may be transmitted to a remotely located display device and/or speaker unit.

As discussed briefly before, a user may have a desire or a need to prove his or her location during a specific timeframe, over multiple timeframes, and/or at one or more locations over a specific or multiple timeframes. It may be useful to accurately and securely verify the presence of the user at a location at a specific time. In at least one example, the user may be the suspect in a criminal case and would like to provide an accurate, and confirmed, timeline of his or her whereabouts during a time period in question. In another example, the user may be an employee or an independent contractor and may desire an accurate accounting of his or her whereabouts for being paid, liability issues, and the like. Other potential examples are contemplated and are not limited to those described.

In at least one example scenario, the user may want to create an alibi of his or her whereabouts over the course of an example month. In this scenario, the user may own a smartphone, and may download an alibi tracking software application (e.g., an app, hereinafter "alibi app") to his or her smartphone. The alibi app may be, may include, or may be included in the alibi determination component 230. The smartphone may have an International Mobile Equipment Identity (IMEI) number which identifies the hardware associated with the smartphone. In addition to an IMEI number, other identifiers may be associated with the smartphone, and then subsequently associated with the user such that the user is linked to his or her smartphone as the owner and/or the possessor of the smartphone. In some embodiments, the user may also have applications on the smartphone that indicate he or she is the owner, user, and possessor of the smartphone such as applications to which he or she is signed in, as well as information obtained by and/or stored in a database associated with the smartphone that identifies the user (e.g., email, location tracking, biometric sign-in, password managers). When the user downloads the alibi app, the user may be requested to associate himself or herself with the alibi app by providing fingerprint samples, voice print samples, and/or other biometrics. Furthermore, the user may be asked to create a password or a personal identification number (PIN).

With regard to the alibi app, the user may set data obtaining defaults, such as opting-in to automatic data collection, or alternatively, opting-out of automatic data collection. The user may identify places he or she is as a habit, and identify places for the alibi app to obtain data without a manual request, such as setting up geofence parameters, or setting up default times during the day for the alibi app to automatically obtain data. In some embodiments, the user may set a default for the alibi app to prompt him or her to obtain data at a specific time (e.g., 10:00 am on specific date, 1:30 pm every Monday through Friday, 3:00 pm every day, or other specific time and/or day/date) or when the user is determined to be in a specific place. In yet another embodiment, the alibi app may provide the user with information regarding other data gathering means, such as a notification that the user is near a security camera, an RFID reader, a QC reader, or even another person that has a smartphone executing the same alibi app. If the user opts into automatic data collection, the smartphone may be enabled to automatically take photographs, videos, sound recordings, location identification (e.g., by way of GPS coordinate identification), biometric readings, time stamping, or other data collection.

In at least one embodiment, the alibi determination component 230 may be or include a software component as part of a software application (e.g., the alibi app) installed on a computing device (e.g., the local computing device 150). The alibi determination component 230 may thus execute in the background, gathering data from the device 230 itself, from the sensor units 110, and/or from other devices (e.g., the remote computing device 160, the server 140, the network 120, the control panel 130, and/or other devices)

The alibi determination component 230 may generally operate to securely and privately determine and preserve the location history of a user. In some embodiments, determining and preserving the location history of the user is achieved in order to construct a continuous, accurate, and verifiable alibi. In some embodiments, the alibi determination component 230 may provide a time-stamped location history of the user to be used for any purpose and not necessarily for alibi-specific reasons. The alibi determination component 230 may include one or more of a location component 250, an identification component 260, an authentication component 270, and/or an encryption component 280.

In some embodiments, the alibi determination component 230 may automatically and/or continually collect location history of the user with little or no input from the user himself. In some embodiments, the alibi determination component 230 may automatically collect location history of the user, but only when the user is determined to be located at a specific location; for example, if the user and/or the local computing device 150 crosses into or out of an established geofence, or if the local computing device 150 is determined to be at a specific GPS location. In some embodiments, a geofence may be a virtual geographic boundary defined by, for example, GPS or RFID technology that enables software to trigger a response when an electronic device enters or leaves a particular area.

In some embodiments, the user may manually input location information into his or her local computing device 150, or may otherwise use his or her local computing device, or other portable electronic device, to indicate that he or she is at a specific location at a specific time. For example, the user may indicate that he or she is at a specific location at a specific time by, e.g., scanning a bar code on the local computing device 150 at a specific location, an RFID scan, an NFC interaction, a "check-in" on a social media site, taking a photograph, or taking some other action. Some example data collection is described in more detail with respect to the location component 250.

Data obtained automatically and/or manually by the alibi determination component 230 to be used in creating a verifiable accounting of a user's whereabouts at a specific time may include GPS data, WiFi hotspot data, GSM data, WAN Data, LAN Data, short range wireless data (e.g., BLUETOOTH®. NFC), timestamps, photo metadata, Internet usage history, application usage history, device logs, receipt photographs, barcode and/or QR scans, biometric data collection, calendar integration, appointment tracking integration, call history, transportation ticketing information, shopping data, credit card and/or debit card transactions, other banking data, class schedules, the presence of other users, eyewitness accounts, electronic journals, security camera footage, RFID data, photo tagging, social media data, video tagging, cached data, device log files, and/or other location data.

In at least one embodiment, the location component 250 may detect the presence of a user at a specific location. As briefly mentioned previously, the location may be at or include the entrance or exit of a building or a room within a building (e.g., a residential building, commercial building, government building, or other building); curtilage; a public space, such as a park or street; within a location of a geofence, or other location. For purposes of brevity, the detection of presence is not repeated, but is described at other locations within this description.

The identification component 260 may determine the specific identity of the user. In the alternative or additionally, the identification component 260 may confirm and/or verify the specific identity of the user at a pre-determined location and/or to be in possession of an electronic device obtaining data.

In at least one embodiment, the identification component 260 may determine the identification of a user by way of a biometric identification. The biometric identification may include analyzing a fingerprint, a retinal pattern, an iris recognition, facial recognition, a voice print, a palm print, or other biometric marker. Any of the biometric datum may be received at the user's computing device, such as a smartphone, either automatically (e.g., by way of a passive sensor) or actively (e.g., by the user activating a biometric scan on the user's computing device). In some embodiments, the biometric data may be received as input at the sensor unit 110, the control panel 130, or at another local computing device 150 disposed at the location. In some embodiments, the identification component 260 may identify the user by identifying the presence of the user's portable electronic device (e.g., by comparing the device's current GPS data with the location data of the subject property and/or location). In some embodiments, the identification component 260 may receive identification data in the form of a password, personal identification number (PIN), or other alphanumeric input. The identification data received by the identification component 260 may be communicated to the transmitter component 240, and the transmitter component 240 may communicate the data to the remote computing device 160 and/or the server 140.

In some embodiments, the location component 250 and/or the identification component 260, either alone or in combination, may time stamp each time an identified user is located in a specific location, including time stamping an entrance into a building and/or room, or time stamping an exit out of a building and/or a room. In order to determine whether a user is entering or exiting, the location component 250 may use methods to determine the presence of a user in a location or to alternatively determine the lack of a presence of a user in a location (and thus the departure of a user), such as through motion sensors, microphones, cameras, vibration sensors, heat sensors, infrared sensors, NFC technology, wireless communication, or other suitable sensors or devices.

The authentication component 270 may determine that the person indicated as being at a location at a specific time, is in fact the person creating an alibi (or otherwise tracking/confirming the person's presence at a given time and/or location). In at least one embodiment, the authentication component 270 may determine whether the user identified to be at a specific location at a specific time is in fact the identified user. In at least one embodiment, the authentication component 270 may determine that the location and time data obtained is verifiable, accurate, and/or authentic.

In some embodiments, authentication is accomplished by cross-referencing two or more pieces of obtained data, such as GPS data showing a theater, with a photograph (with metadata) taken of a ticket stub or receipt. Other authentication may be accomplished by taking automatic, continual or intermittent, photographs with the camera, and automated acquisition of wireless data (LAN, Bluetooth, RFID). In alternative or additional embodiments, movement patterns established by GPS, or by accelerometers and gyroscopes in an electronic device, may be enabled to determine whether unnatural movements are being made.

In at least one embodiment, the authentication component 270 may use multi-factor authentication; for example, a user may be associated with a portable computing device, such as a smartphone, and the user may use his or her smartphone to "check-in" at the location. A smartphone, however, may be carried by anyone, not just the owner; thus, the authentication component 270 may correlate the identifying information obtained from the smartphone with biometric information input. In some embodiments, the biometric information may be input at or otherwise received at the smartphone itself. In other embodiments, the location of the smartphone may be determined, such as through verified GPS coordinate matching, and a user may input biometric information into a computing device or sensor located within a pre-determined distance from the smartphone's current GPS coordinates. In some embodiments, a third party source may be used to authenticate the user; for example, if the user's smartphone is identified as being located near the GPS coordinates of a bank having a security camera at a specific time (e.g., 3:21 p.m.), an algorithm capable of identifying a person using facial structure and/or gait may be run on the security camera video to confirm that the user in the video and the user purporting to be the owner of the phone are one and the same at that location and at that time.

In some embodiments, the authentication component 270 may provide online biometric authentication such that a user that wants to provide input to or access a device and/or server may perform a biometric scan on or with his or her smartphone (or other portable electronic device). After the scan is received by a remote computing device, a confirmation of authentication may be communicated by way of a secure connection to a cloud-based server (e.g., server 140). NFC technology, or other short-range wireless technology (LAN, BLUETOOTH®, etc.) may be used to confirm that the user who provided the biometric data is in proximity to the input device and/or service with which the user is attempting to interact.

In some embodiments, a third party may maintain a database of users, where the database contains identifying information for authentication. For example, the database may store biometric information, gait data, passwords, PIN codes, smartphone identification data (e.g., a mobile subscription identification number (MSIN), an international mobile subscriber identity (IMSI), an electronic serial number (ESN), etc.), and/or other suitable data.

In some embodiments, the user's portable electronic device (e.g., smartphone, smartwatch), may include sensors enabled to detect weather patterns and changes, such as temperature and barometric pressure. The authentication component 270 may use the weather data obtained by the user's portable electronic device to confirm the device was at a specific location at a specific time.

In some embodiments, the user's portable electronic device may be enabled to automatically take photographs, videos, sound clips, and other multimedia records of the user's surroundings. The media, either alone or combined with metadata and other data, may be used to authenticate that the user is where he or she purports to be at a specific time.

In still yet another embodiment, the system may determine that another user has downloaded the alibi app onto his or her smartphone or other portable electronic device. In one example, the first user's device may send a request to the second user's device to ask the second device to obtain data for the first user; for example, taking a photograph, making a note that the first user is identified as being located within X distance from the second user, or obtaining other data for the first user. In some embodiments, the data gathered from the second user's device may be used to corroborate that the first user was where he or she said she was, or that the first user was at a location indicated by the first user's phone or by other data, at a specific time.

For the accounting to have value, it may be important to prove that the data contained in the accounting (whether it be raw data or analyzed data) is true and accurate. In some cases, GPS spoofing and/or falsification of GPS data may be a common problem, rendering any accounting untrustworthy. Thus, in at least one embodiment, in order to provide a true and accurate accounting, the authentication component 270 may employ one or more forms of defense to counteract manipulation of the data. In one example, if data is determined to be manipulated, the user may be notified, and their account may be disabled. In some embodiments, the authentication component 270 may also ensure that the data used to compile the accounting has not been tampered with or otherwise falsified (i.e., locations, times, authentication data).

In some embodiments, the encryption component 280 may ensure that identification data and location data is stored and communicated in a secure manner. In some embodiments, the encryption component 280 ensures that the data obtained, processed, and communicated is done so while maintaining the privacy of the user. Although an encryption component 280 is provided, encryption may be an optional action taken with regards to obtaining, linking, and/or authenticating the identification data and location data. Thus, in some embodiments, the data may be subject to encryption. Encryption methods may include checksums, cyclic redundancy checks (CRC), public key encryption (e.g., secure sockets layer (SSL), transport layer security (TLS)), hashing algorithms, advanced encryption standard (AES), block chain algorithms, or other suitable encryption.

In one example, block chaining may be implemented to encrypt the data and/or protect it against manipulation or alteration. Block chaining may include or involve a continuously growing list of records or "blocks" linked together and secured using a manner of cryptography such as a hashing algorithm. Each new block at the end of the chain may contain a cryptographic hash of the previous block, as well as a time stamp and transactional data. In some embodiments, the new block may be considered the "head record." For example, as the user builds his or her alibi or otherwise generates data according to embodiments disclosed herein, each new datum of the user's location at a specific time and a hash of the previous block may become the latest or newest "block" to the block chain. After each new block is recorded, the data in any given block cannot be altered retroactively without altering all of the subsequent blocks.

When a user wishes to provide his or her unaltered alibi (e.g., to the police or a court, etc.), he or she can provide the hashing algorithm and/or cryptography key to unravel the block chain from the newest block to the original block. If the block chain is able to be unraveled from one block to the next, the data has not been modified. If the block chain is not able to be unraveled from one block to the next, the data has likely been modified and the original data cannot be accessed. In some embodiments, the block chain may be associated with data from multiple devices (e.g., multiple cell phones, multiple computers, etc.), whereas in other embodiments, the block chain may be tied to a particular device (e.g., the user's smartphone or smart watch).

Data obtained by and/or sent to any of the devices described herein, including the sensor units 110, the control panel 130, the local computing device 150, the remote computing device 160, and/or the server 140 may be securely transferred using any encryption and security techniques contemplated, not necessarily through block chaining methods.

In one example, the software application described herein may be prevented from executing on a rooted or jailbroken device. In another example, identification and location data may be stored (e.g., on a local computing device, on a remote computing device, on a remote server, in the "cloud", or in another location) using a public and/or a private cryptographic key. In the example where the data is stored using a private cryptographic key, the user for whom the location data is being obtained may keep possession of his or her private key so that none of the data obtained and stored can be decrypted without possession of the private key; for example, when an alibi accounting is needed, the user may provide his or her private key to an alibi manager (e.g., an attorney, a detective, a government official, an employer). The alibi manager may then download or obtain the complete alibi data/accounting with belief that the data has not been manipulated. In some embodiments, the alibi manager cannot read the data without the private key, and the user cannot utilize all the alibi data without voluntarily providing the key to the alibi manager.

In some cases, cross-referencing the GPS data with a secondary piece of datum may be sufficient to establish a reliable alibi; for example, cross-referencing GPS data with photo metadata for a photograph taken at the same time and at the same purported location, or cross-referencing GPS data with eyewitness accounts, or security camera data may be two pieces of datum used in combination to establish a reliable alibi.

Figure 3:
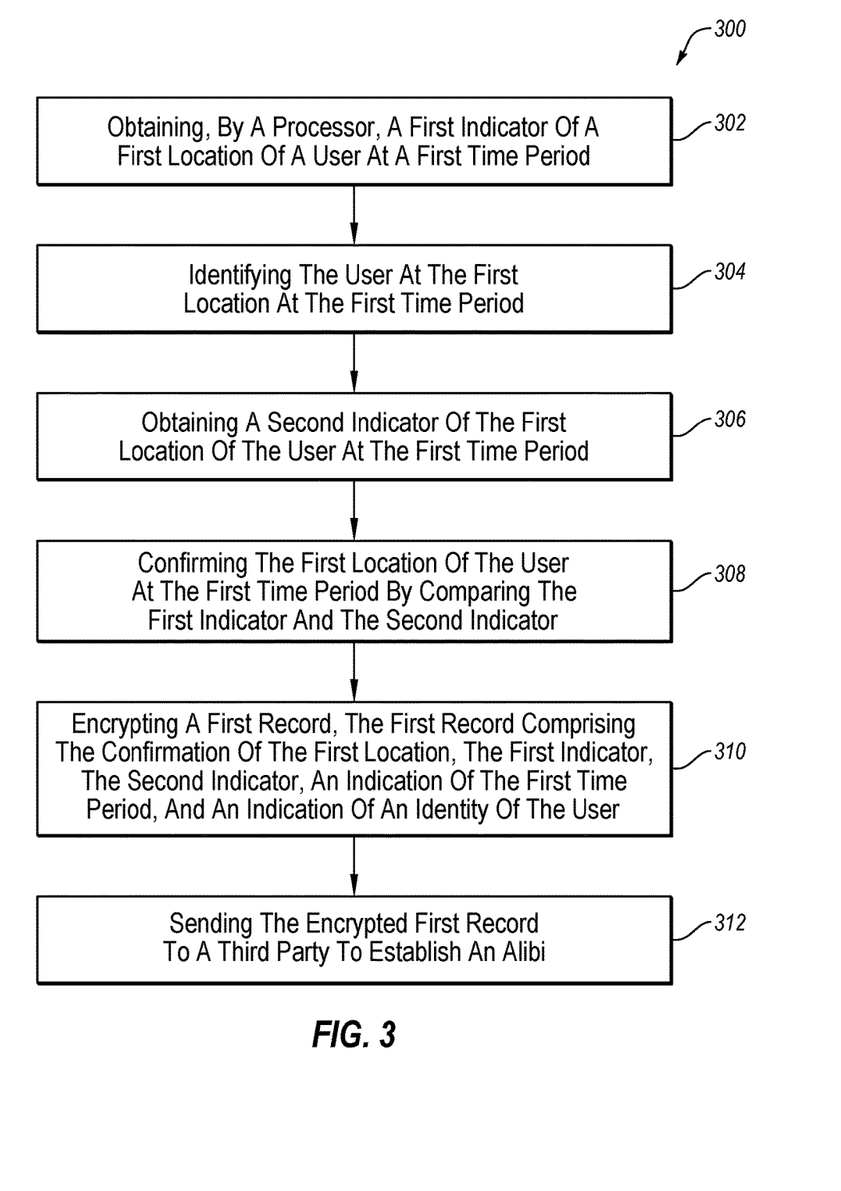
FIG. 3 illustrates a flowchart of an example method of time and location-based user tracking and presence confirmation in accordance with at least one embodiment.

FIG. 3 illustrates a flowchart of an example method 300 of time and location-based user tracking and presence confirmation in accordance with at least one embodiment. The method 300 may be performed by any suitable system, apparatus, or device. Although illustrated with discrete blocks, the steps and operations associated with one or more of the blocks of the method 300 may be divided into additional blocks, combined into fewer blocks, or eliminated, depending on the particular implementation.

At block 302, the method may obtain, by a processor, a first indicator of a first location of a user at a first time period. In one embodiment, block 302 may be performed by a location component, such as the location component 250 described with reference to FIG. 2. For example, with reference to block 302, a smartphone being carried by the user may be identified by an RFID reader upon entry to the user's home, and one or both of the smartphone and the RFID reader may include or be implemented as the location component.

At block 304, the method 300 may include identifying the user at the first location at the first time period. In at least one embodiment, block 304 may be performed by an identification component, such as the identification component 260 of FIG. 2. For example, with reference to block 304, the user may be identified based on a biometric scan on the smartphone that includes or is implemented as the identification component.

At block 306, the method 300 may include obtaining a second indicator of the first location of the user at the first time period. In at least one embodiment, block 306 may be performed by a location component, which may be the same as or different than the location component 250 that performs block 304. For example, with reference to block 306, the presence of the user may be identified again by way of a security camera installed at the user's front door, where the security camera includes or is implemented as the location component.

At block 308, the method 300 may include confirming the first location of the user at the first time period by comparing the first indicator and the second indicator. In at least one embodiment, block 308 may be performed by an authentication component, such as the authentication component 270 of FIG. 2. For example, with reference to block 308, the biometric scan at the smartphone during the first presence identification may be compared by the smartphone (that includes or is implemented as the authentication component) to facial recognition from the security camera during the second presence identification (which may occur at or near the same time as the first presence identification), confirming that the user with the smartphone is the same user seen in the security video.

At block 310, the method 300 may include storing the first record on a storage device. In at least one embodiment, the first record may be sent by the transmitter component 240 of FIG. 2 and stored on, for example, one of local computing device 150, remote computing device 160, and/or server 140.

At block 312, the method 300 may include obtaining, by the processor, a third indicator of a second location of the user at a second time period. In at least one embodiment, block 312 may be performed by a location component, which may be the same as or different than the location component 250 that performs blocks 304 and/or 306. For example, with reference to block 312, the presence of the user may be identified again by way of an RFID reader installed at the user's office front door, where the RFID reader includes or is implemented as the location component 270.

At block 314, the method 300 may include identifying the user at the second location at the second time period. In at least one embodiment, the user may be identified a second time, and block 314 may be performed by identification component 260.

At block 316, the method 300 may include storing a second record on the storage device, the second record comprising the third indicator of the second location, a second indication of the second time period, and a second indication of the identity of the user at the second location at the second time period. In at least one embodiment, the second record may be sent by the transmitter component 240 of FIG. 2 and stored on, for example, one of local computing device 150, remote computing device 160, and/or server 140.

At block 318, the method 300 may include linking the first record and the second record to create an unalterable third record of an alibi of the user. In one embodiment, block 318 may be enabled through block chain technology. In an additional or alternative embodiment, any of the first, second, and/or third records may be encrypted, and thus may be enabled by encryption component 280.

The method 300 may improve the efficiency and efficacy of time and location-based user tracking and presence confirmation; for example, determining the presence of and authenticating the identification of a user at a location over a number of iterations may help to identify a user's whereabouts more quickly and with more accuracy than with obtaining a single datum at a single time and location.

In an alternative or additional embodiment, the accuracy of determining an alibi may be improved by using computer learning algorithms and/or artificial intelligence techniques. In some embodiments, a computer learning algorithm may be applied to the comparison of two indications of location at a specific time (e.g., a GPS indicator and a photograph taken of the user during the same time period). An accuracy or confidence score may be determined based on the comparison, and the indication of presence at a specific location at a specific time may be assigned an accuracy score. With each iteration of collecting the presence of an individual at a location using at least one or more data points, the computer learning algorithm may increasing improve the accuracy and reliability of each successive collection of data.

Modifications, additions, or omissions may be made to the method 300 without departing from the scope of the present disclosure. For example, the operations of method 300 may be implemented in a different order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 4:
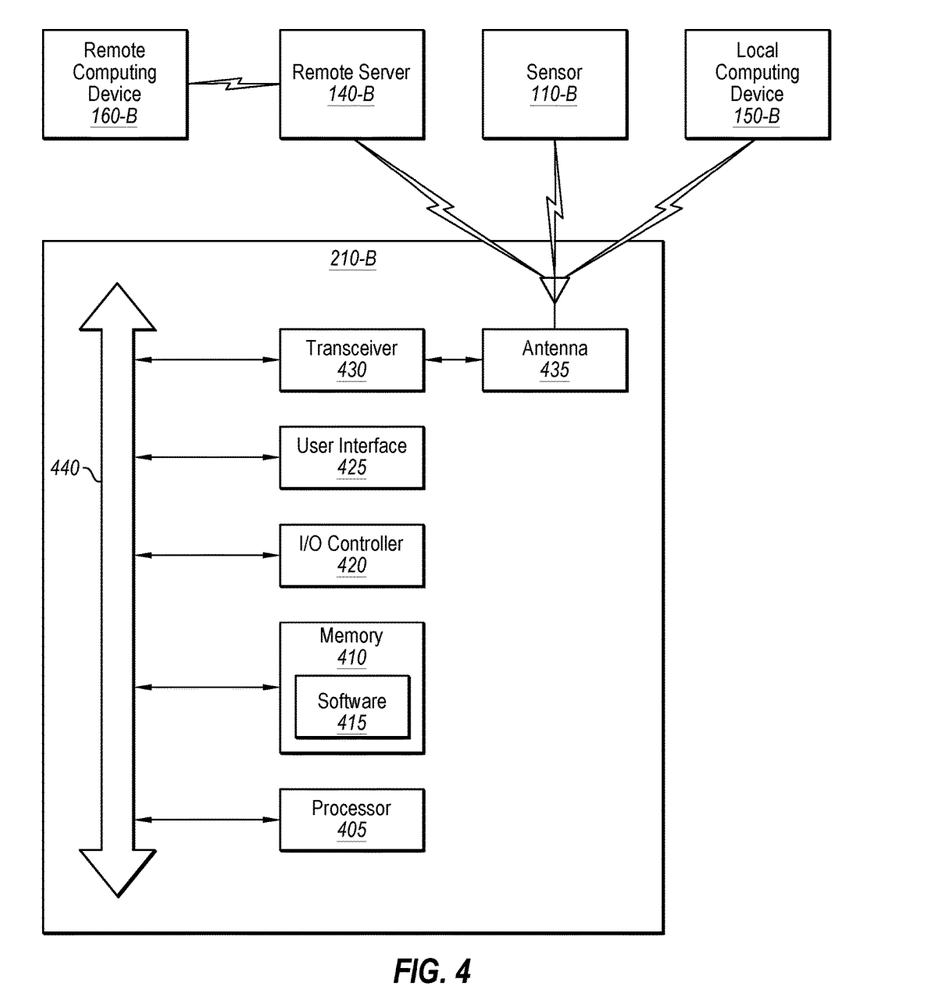
FIG. 4 illustrates a system for use in time and location-based user tracking and presence confirmation in accordance with at least one embodiment.

FIG. 4 illustrates a system 400 for use in time and location-based user tracking and presence confirmation in accordance with at least one embodiment. The system may include an apparatus 210-*b*, which may be an example of one or more aspects of any of the sensor unit 110, the control panel 130, the server 140, the local computing device 150, and/or the remote computing device 160 described with reference to FIG. 1. The apparatus 210-*b* may also be an example of one or more aspects of the apparatus 210 described with reference to FIG. 2.

The apparatus 210-*b* may include components for bi-directional voice and data communications including components for transmitting communications and components for receiving communications. For example, the apparatus 210-*b* may communicate bi-directionally with one or more of a local computing device 150-*b*, one or more sensor units 110-*b*, a remote computing device 160-*b*, and/or a remote server 140-*b*, which may include or correspond to the similarly named and numbered components described with reference to FIG. 1. This bi-directional communication may be direct (e.g., the apparatus 210-*b* communicating directly with the remote computing device 160-*b*) or indirect (e.g., the apparatus 210-*b* communicating indirectly with the remote computing device 160-*b* through the remote server 140-*b* or one or more other intervening components).

The apparatus 210-*b* may also include a processor 405, memory 410 (including software/firmware code (SW) 415), an input/output controller 420, a user interface 425, a transceiver 430, and one or more antennas 435 each of which may communicate—directly or indirectly—with one another (e.g., via one or more buses 440). The transceiver 430 may communicate bi-directionally—via the one or more antennas 435, wired links, and/or wireless links—with one or more networks or remote devices as described above. For example, the transceiver 430 may communicate bi-directionally with one or more of the sensor units 110-*b*, the local computing device 150-*b*, the remote computing device 160-*b*, and/or the remote server 140-*b*. The transceiver 430 may include a modem to modulate the packets and provide the modulated packets to the one or more antennas 435 for transmission, and to demodulate packets received from the one or more antennas 435. While the apparatus 210-*b* may include a single antenna 435, the apparatus 210-*b* may also have multiple antennas 435 capable of concurrently transmitting or receiving multiple wired and/or wireless transmissions. In some embodiments, one element of the apparatus 210-*b* (e.g., one or more antennas 435, transceiver 430, etc.) may provide a direct connection to the remote server 140-*b* via a direct network link to the Internet via a POP (point of presence). In some embodiments, one element of the apparatus 210-*b* (e.g., one or more antennas 435, transceiver 430, etc.) may provide a connection using wireless techniques, including digital cellular telephone connection, Cellular Digital Packet Data (CDPD) connection, digital satellite data connection, and/or another connection.

The signals associated with the system 400 may include wireless communication signals such as radio frequency, electromagnetics, LAN, WAN, virtual private network (VPN), wireless network (using 802.11, for example), 345 MHz, Z-WAVE®, cellular network (using 3G and/or LTE, for example), and/or other signals. The one or more antennas 435 and/or transceiver 430 may include and/or may be related to WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB), or other antennas or standards. In some embodiments, each antenna 435 may receive signals or information specific and/or exclusive to itself. In some embodiments, each antenna 435 may receive signals or information not specific or exclusive to itself.

In some embodiments, one or more sensor units 110-*b* may connect to some element of the system 400 via a network using one or more wired and/or wireless connections. In some embodiments, the user interface 425 may include an audio device, such as an external speaker system, an external display device such as a display screen, and/or an input device (e.g., a remote control device interfaced with the user interface 425 directly and/or through the input/output controller 420). One or more buses 440 may allow data communication between one or more elements of the apparatus 210-*b* (e.g., between one or more of the processor 405, the memory 410, the input/output controller 420, the user interface 425, and/or other elements of the apparatus 210-*b*).

The memory 410 may include RAM, ROM, flash RAM, and/or other types. The memory 410 may store computer-readable, computer-executable software/firmware code 415 including instructions that, when executed, cause the processor 405 to perform various functions described in this disclosure (e.g., time-based verification for determining the presence of users at specific locations). Alternatively, the software/firmware code 415 may not be directly executable by the processor 405 but may cause a computer (e.g., when compiled and executed) to perform functions described herein. Alternatively, the computer-readable, computer-executable software/firmware code 415 may not be directly executable by the processor 405 but may be configured to cause a computer (e.g., when compiled and executed) to perform functions described herein. The processor 405 may include an intelligent hardware device, e.g., a central processing unit (CPU), a microcontroller, an application-specific integrated circuit (ASIC), etc.

In some embodiments, the methods and/or operations described herein may be executed or run on different components of the system 400 and/or any of the computing devices described with reference to FIGS. 1 and/or 2. For example, in some embodiments, location and/or identification data may be obtained by the local computing device 150 (of FIG. 1), and processing with regard to the obtained data may be performed by the processor of the local computing device 150. The encrypted data, however, may be sent to and stored at a remote server (e.g., "the cloud," the remote server 140, the remote server 140-*b*, and/or other remote server or location). In some embodiments, location and/or identification data may be collected by the local computing device 150, 150-*b*, but may be sent to a remote computing device (e.g., 160, 160-*b*) for storage and/or processing. In some embodiments, encryption methods to secure the data and prevent malicious manipulation may be enabled on the local computing device 150, 150-*b*, with the encrypted output being stored on the remote server 140, 140-*b*, and/or the remote computing device 160, 160-*b*.

In some embodiments, the memory 410 may contain, among other things, a Basic Input-Output system (BIOS) which may control basic hardware and/or software operations such as the interaction with peripheral components or devices. Applications resident with system 400 are generally stored on and accessed via a non-transitory computer-readable medium, such as a hard disk drive or other storage medium. Additionally, applications may be in the form of electronic signals modulated in accordance with the application and data communication technology when accessed via a network interface (e.g., the transceiver 430, the one or more antennas 435, etc.).

Many other devices and/or subsystems may be connected to one or more, or may be included as one or more elements of the system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements illustrated in FIG. 4 need not be present to practice the present systems and methods. The devices and subsystems may be interconnected in different ways from that illustrated in FIG. 4. In some embodiments, an aspect of some operation of a system, such as that illustrated in FIG. 4, may be readily known in the art and are not discussed in detail in this application. Code to implement the present disclosure may be stored in a non-transitory computer-readable medium such as one or more of the system memory 410 or other memory. The operating system provided on the input/output controller 420 may be or include iOS®, ANDROID®, MS-DOS®, MS-WINDOWS®, OS/2®, UNIX®, LINUX®, or another known operating system, or a proprietary operating system.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. As an aid to understanding, the following appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining, by a processor, a first indicator of a first location of a user at a first time period;
   identifying the user at the first location at the first time period;
   obtaining a second indicator of the first location of the user at the first time period;
   confirming the first location of the user at the first time period by comparing the first indicator and the second indicator;
   storing the first record on a storage device;
   obtaining, by the processor, a third indicator of a second location of the user at a second time period;

identifying the user at the second location at the second time period;
storing a second record on the storage device, the second record comprising the third indicator of the second location, a second indication of the second time period, and a second indication of the identity of the user at the second location at the second time period;
linking the first record and the second record to create an unalterable third record of an alibi of the user;
encrypting the unalterable third record; and
sending the third record to a third party.

2. The method of claim 1, wherein identifying the user further comprises obtaining biometric data from the user.

3. The method of claim 1, wherein obtaining the first, second, and third indicator further comprises obtaining at least one of photographic data, video data, sound data, text data, wireless data, or alphanumeric data.

4. The method of claim 1 wherein obtaining the second indicator further comprises obtaining the second indicator by a second means different from a first means to obtain the first indicator.

5. The method of claim 1 wherein obtaining the second indicator further comprises:
requesting, by the processor, data from a device of a second user identified to be within a pre-determined distance of the first location at the first time; and
confirming the presence of the user at the first location at the first time period based at least on data from the device of the second user.

6. The method of claim 1, further comprising:
applying a computer learning algorithm to the comparison of the first indicator and the second indicator;
determining an accuracy score of the first record based in part on applying the computer learning algorithm; and
updating the first record based in part on the accuracy score.

7. The method of claim 1, wherein linking the first record and the second record further comprises linking using block chain encryption.

8. The method of claim 1, wherein obtaining the first indicator of the first location comprises obtaining, by the processor, the first indicator automatically obtained without input from the user.

9. The method of claim 8, wherein obtaining the first indicator automatically further comprises:
determining, by the processor, that the user is within a pre-determined distance of the first location, and
automatically obtaining the first indicator in response to determining that the user is within the pre-determined distance of the first location.

10. The method of claim 1, wherein obtaining the first indicator of the first location comprises receiving, at the processor, a request from the user to obtain the first indicator of the first location at the first time.

11. The method of claim 1, further comprising:
determining an attempt to falsify the first record, and
blocking further attempts to obtain indicators of the location of the user.

12. The method of claim 1, further comprising storing the first record in memory associated with the processor.

13. The method of claim 1, further comprising sending the encrypted first record to a third party storage device.

14. A system for establishing an alibi, comprising:
a processor,
a memory in electronic communication with the processor; and
instructions stored in the memory, the instructions being executable by the processor to cause the system to perform operations comprising:
obtaining, by a processor, a first indicator of a first location of a user at a first time period;
identifying the user at the first location at the first time period;
obtaining a second indicator of the first location of the user at the first time period;
confirming the first location of the user at the first time period by comparing the first indicator and the second indicator;
storing the first record on a storage device;
obtaining, by the processor, a third indicator of a second location of the user at a second time period;
identifying the user at a second location at the second time period;
storing a second record on the storage device, the second record comprising the third indicator of the second location, a second indication of the second time period, and a second indication of the identity of the user at the second location at the second time period;
linking the first record and the second record to create an unalterable third record of an alibi of the user;
encrypting the unalterable third record; and
sending the third record to a third party.

15. The system of claim 14, further comprising:
a biometric sensor in electronic communication with the processor, wherein the instructions are further executable by the processor to cause the system to perform operations comprising:
obtaining, by the biometric sensor, biometric data of the user at the first location at the first time period;
comparing the obtained biometric data of the user at the first location at the first time period with biometric data stored in a database and associated with an owner of the system; and
determining that the user at the first location at the first time period is the same as the owner of the system.

16. The system of claim 14, further comprising:
a camera in electronic communication with the processor, wherein the instructions are further executable by the processor to cause the system to perform operations comprising:
automatically obtaining photographs at the first location during the first time period upon determining that the system is located within a pre-determined distance of the first location.

17. The system of claim 14, further comprising:
a camera in electronic communication with the processor, wherein the instructions are further executable by the processor to cause the system to perform operations comprising:
automatically obtaining audiovisual data at the first location during the first time period upon determining that the system is located within a pre-determined distance of the first location.

18. One or more non-transitory computer-readable media comprising one or more computer-readable instructions that, when executed by one or more processors of a computing device cause the computing device to perform a method comprising the steps of:
obtaining, by a processor, a first indicator of a first location of a user at a first time period;
identifying the user at the first location at the first time period;

obtaining a second indicator of the first location of the user at the first time period;
confirming the first location of the user at the first time period by comparing the first indicator and the second indicator;
storing the first record on a storage device;
obtaining, by the processor, a first indicator of a second location of the user at a second time period;
identifying the user at a second location at the second time period;
storing a second record on the storage device, the second record comprising the third indicator of the second location, a second indication of the second time period, and a second indication of the identity of the user at the second location at the second time period;
linking the first record and the second record to create an unalterable third record of an alibi of the user;
encrypting the unalterable third record; and
sending the third record to a third party.

* * * * *

UNITED STATES PATENT AND TRADEMARK OFFICE
CERTIFICATE OF CORRECTION

PATENT NO. : 10,187,754 B1  
APPLICATION NO. : 16/042426  
DATED : January 22, 2019  
INVENTOR(S) : Christopher G. Hansen Page 1 of 1

It is certified that error appears in the above-identified patent and that said Letters Patent is hereby corrected as shown below:

In the Claims

Column 20, Line 65, Claim 1 delete "the" and insert -- a --.

Column 21, Line 11, Claim 1 delete "the third record" and insert -- the encrypted unalterable third record --.

Column 21, Line 27, Claim 5 delete "the first time" and insert -- the first time period --.

Column 21, Line 28, Claim 5 delete "the presence" and insert -- a presence --.

Column 21, Line 55, Claim 10 delete "the first time" and insert -- the first time period --.

Column 21, Line 63, Claim 13 delete "first record" and insert -- unalterable third record --.

Column 22, Line 14, Claim 14 delete "the" and insert -- a --.

Column 22, Line 27, Claim 14 delete "the third record" and insert -- the encrypted unalterable third record --.

Column 23, Line 6, Claim 18 delete "the" and insert -- a --.

Column 23, Line 7, Claim 18 delete "first indicator" and insert -- third indicator --.

Column 23, Line 19, Claim 18 delete "the third record" and insert -- the encrypted unalterable third record --.

Signed and Sealed this  
Twelfth Day of November, 2019

Andrei Iancu  
*Director of the United States Patent and Trademark Office*